(12) United States Patent
Upshinskii

(10) Patent No.: US 11,790,675 B2
(45) Date of Patent: Oct. 17, 2023

(54) RECOGNITION OF HANDWRITTEN TEXT VIA NEURAL NETWORKS

(71) Applicant: ABBYY Development Inc., Dover, DE (US)

(72) Inventor: Andrei Upshinskii, Moskovskaya obl. (RU)

(73) Assignee: ABBYY Development Inc., Dover, DE (US)

( * ) Notice: Subject to any disclaimer, the term of this patent is extended or adjusted under 35 U.S.C. 154(b) by 201 days.

(21) Appl. No.: 17/107,256

(22) Filed: Nov. 30, 2020

(65) Prior Publication Data

US 2022/0164589 A1 May 26, 2022

(30) Foreign Application Priority Data

Nov. 24, 2020 (RU) ................................ 2020138488

(51) Int. Cl.
| | | |
|---|---|---|
| *G06V 30/148* | (2022.01) | |
| *G06V 30/413* | (2022.01) | |
| *G06N 3/04* | (2023.01) | |
| *G06F 18/214* | (2023.01) | |
| *G06V 30/10* | (2022.01) | |

(52) U.S. Cl.
CPC .......... *G06V 30/153* (2022.01); *G06F 18/214* (2023.01); *G06N 3/04* (2013.01); *G06V 30/413* (2022.01); *G06V 30/10* (2022.01)

(58) Field of Classification Search
CPC ..... G06V 30/10; G06V 30/153; G06V 30/148
See application file for complete search history.

(56) References Cited

U.S. PATENT DOCUMENTS

2003/0118235 A1* 6/2003 Kim ..................... G06V 10/267
382/178
2018/0025248 A1 1/2018 Shan et al.
(Continued)

FOREIGN PATENT DOCUMENTS

| JP | 2019506208 A | 3/2019 |
|---|---|---|
| RU | 2008147115 A | 6/2010 |

OTHER PUBLICATIONS

Neural Network, Wikipedia, last edited Oct. 28, 2020, https://ru.wikipedia.org/wiki/Нейронная_сеть , 16 pages.
(Continued)

*Primary Examiner* — Ross Varndell
(74) *Attorney, Agent, or Firm* — Lowenstein Sandler LLP

(57) ABSTRACT

In one embodiment, a system receives an image depicting a line of text. The system segments the image into two or more fragment images. For each of the two or more fragment images, the system determines a first hypothesis to segment the fragment image into a first plurality of grapheme images and a first fragmentation confidence score. The system determines a second hypothesis to segment the fragment image into a second plurality of grapheme images and a second fragmentation confidence score. The system determines that the first fragmentation confidence score is greater than the second fragmentation confidence score. The system translates the first plurality of grapheme images defined by the first hypothesis to symbols. The system assembles the symbols of each fragment image to derive the line of text.

18 Claims, 10 Drawing Sheets

(56) References Cited

U.S. PATENT DOCUMENTS

2018/0137349 A1* 5/2018 Such .................. G06N 3/0445
2019/0258925 A1  8/2019 Li et al.

OTHER PUBLICATIONS

Convolutional neural network, Wikipedia, last edited Apr. 22, 2020, https://ru.wikipedia.org/wiki/Свёрточная_нейронная_сеть, 6 pages.
Comparison of deep-learning software, Wikipedia, last edited Nov. 23, 2020, https://en.wikipedia.org/wiki/Comparison_of_deep-learning_software, 4 pages.
Search Report for Russian Patent Application No. 2020138488, dated Nov. 24, 2020, 2 pages.

* cited by examiner

RECOGNITION OF HANDWRITTEN TEXT VIA NEURAL NETWORKS

CROSS REFERENCE TO RELATED APPLICATIONS

This application claims the benefit of priority to Russian patent application No. 2020138488, filed Nov. 24, 2020; which is hereby incorporated by reference in its entirety.

TECHNICAL FIELD

The present disclosure is generally related to computer systems, and is more specifically related to systems and methods for recognition of handwritten text via neural networks.

BACKGROUND

It may be difficult to formalize an algorithm to recognize handwritings since the shape, size and, consistency of hand printed characters may vary, even if a person writes in block letters. Furthermore, the same letters printed by different people, and the same letters printed by the same person at different times or under different circumstances may appear completely different.

SUMMARY OF THE DISCLOSURE

Embodiments of the present disclosure describe a system and method to recognize handwritten text (including hieroglyphic symbols) using deep neural network models. In one embodiment, a system receives an image depicting a line of text. The system segments the image into two or more fragment images. For each of the two or more fragment images, the system determines a first hypothesis to segment the fragment image into a first plurality of grapheme images and a first fragmentation confidence score. The system determines a second hypothesis to segment the fragment image into a second plurality of grapheme images and a second fragmentation confidence score. The system determines that the first fragmentation confidence score is greater than the second fragmentation confidence score. The system translates the first plurality of grapheme images defined by the first hypothesis to symbols. The system assembles the symbols of each fragment image to derive the line of text.

BRIEF DESCRIPTION OF THE DRAWINGS

The present disclosure is illustrated by way of example, and not by way of limitation, and may be more fully understood with reference to the following detailed description when considered in connection with the Figures in which.

DETAILED DESCRIPTION

Figure 1A:
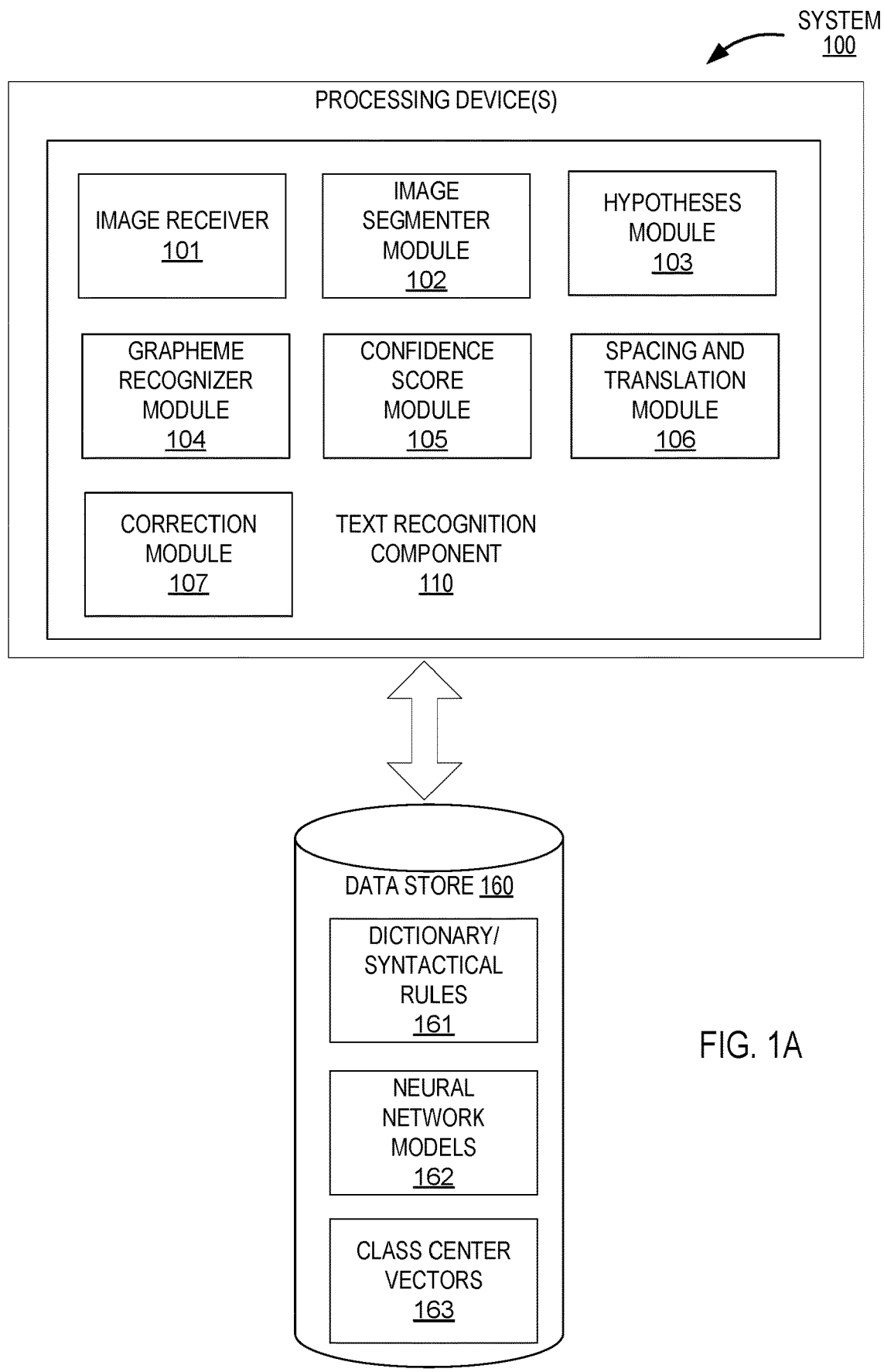
FIGS. 1A-1B depict high level system diagrams of an example text recognition system in accordance with one or more aspects of the present disclosure.

Optical character recognition may involve matching a given grapheme image with a list of candidate symbols, followed by determining the probability associated with each candidate symbol. The higher the probability of match, the higher the likelihood that the candidate symbol is the correct symbol. Two problems, however, arise in single character recognition: ambiguity in the individual character and incorrect image segmentation. The first problem arises because the same image in a different context may correspond to different characters, e.g., characters for different languages, number, name, date, email, etc. The second problem arises if the grapheme image does not contain a valid symbol, i.e., the grapheme image does not contain an entire symbol or the grapheme image represents two symbols glued together.

Described herein are methods and systems for handwritten text recognition. The text recognition process may extract computer-readable and searchable textual information from indicia-bearing images of various media (such as hand printed paper documents, banners, posters, signs, billboards, and/or other physical objects bearing visible graphemes on one or more of their surfaces). "Grapheme" herein shall refer to the elementary unit of a writing system of a given language. A grapheme may be represented, e.g., by a logogram representing a word or a morpheme, a syllabic character representing a syllable, or an alphabetic character representing a phoneme. "Fragment" herein shall refer to a paragraph, a sentence, a title, a part of a sentence, a word combination, for example, a noun group, etc. "Handwritten text" or "handwritten characters" is broadly understood to include any characters, including cursive and print characters, that were produced by hand using any reasonable writing instrument (such as pencil, pen, etc.) on any suitable substrate (such as paper) and further includes characters that were generated by a computer in accordance with user interface input received from a pointing device (such as stylus). In an illustrative example, a string of handwritten characters may include visual gaps between individual characters (graphemes). In another illustrative example, a string of handwritten characters may include one or more conjoined characters with no visual gaps between individual characters (graphemes).

In accordance with aspects of the present disclosure, the text recognition process involves a segmentation stage and a stage of recognizing individual characters. Segmentation involves dividing an image into fragment images and then into grapheme images that contain respective individual characters. Different variants of segmentation or hypotheses may be generated and/or evaluated and the best hypothesis may then be selected based on some predetermined criteria.

For individual character recognition, there exists the problems of ambiguity (e.g., the same image in different contexts may correspond to different characters) and incorrectly segmented images may be used as the input for the individual character recognition. The problems in ambiguity and incorrect segmentation may be solved by verification of the character (or grapheme image) at a higher (e.g., image fragment) level. Furthermore, a classification confidence score may be provided for each individual character and a recognized character with a classification confidence score below a predetermined threshold may be discarded to improve the character recognition. The classification confidence score may be generated by a combination of a structural classifier and a neural network classifier, as further described below. The neural network classifier may be trained with positive and negative (invalid/defective) image samples with a loss function that is a combination of center loss, cross entropy loss, and close-to-center penalty loss. Negative image samples may be used as an additional class in neural network classifier.

The combined approach described herein represent significant improvements over various common methods, by employing hypotheses of segmentation and generation of confidence scores for the hypotheses using loss functions. The loss functions can specifically be aimed at training the neural network to recognize valid and invalid or defective grapheme images, thus improving the overall quality and efficiency of optical character recognition. Furthermore, the methods of neural network-based optical character recognition using specialized confidence functions described herein represent significant improvements over various common methods, by employing a confidence function which computes the distances, in the image feature space, between the feature vector representing the input image and vectors representing centers of classes of a set of classes, and transforms the computed distances into a vector of confidence scores, such that each confidence score (e.g., selected from the range of 0-1) reflects the level of confidence of the hypothesis of the input grapheme image representing an instance of a certain class of the set of grapheme classes, as described in more detail herein below.

Various aspects of the above referenced methods and systems are described in details herein below by way of examples, rather than by way of limitation.

Figure 1B:
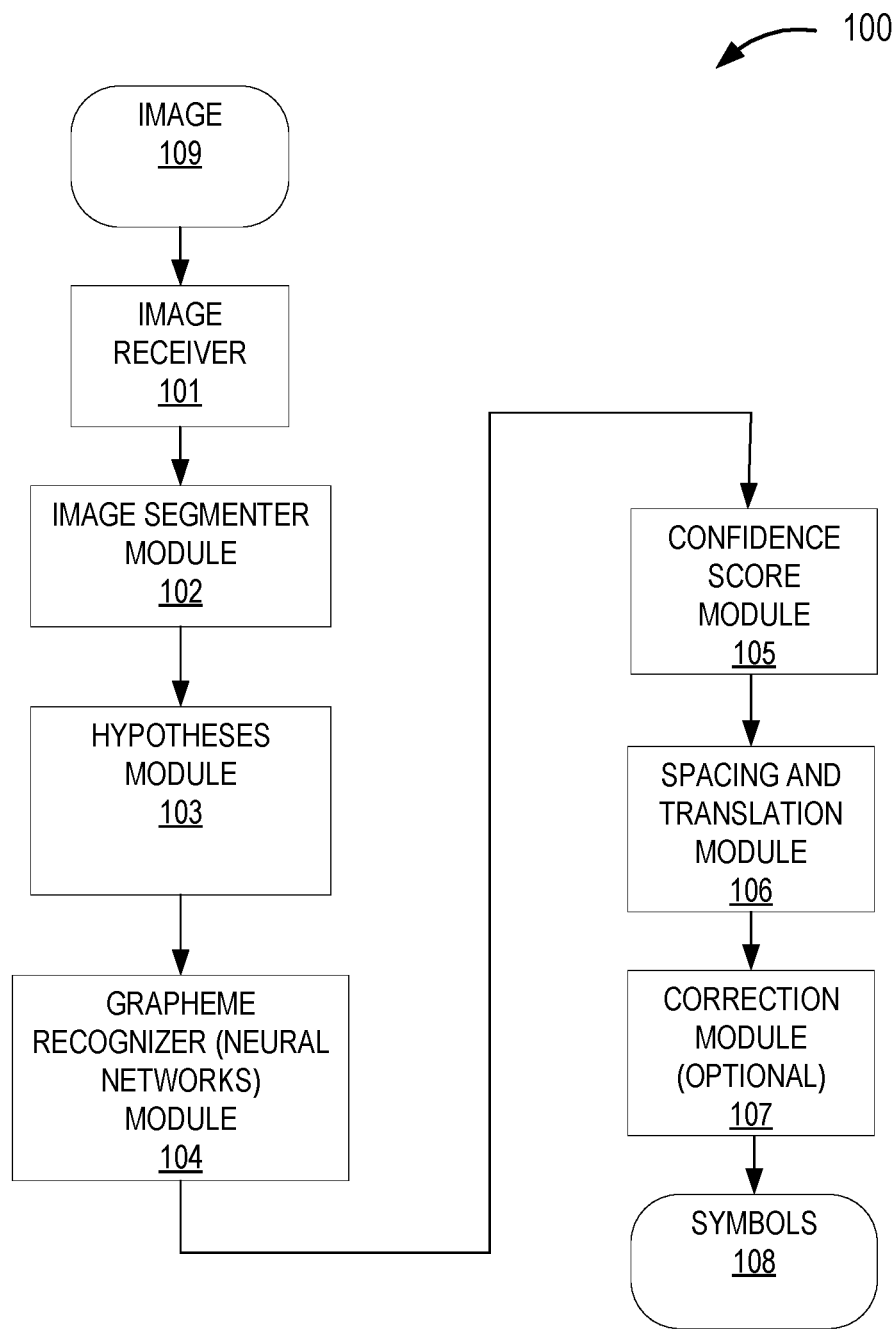

FIGS. 1A-1B depict high level system diagrams of example text recognition systems in accordance with one or more aspects of the present disclosure. The text recognition system 100 may include a text recognition component 110 that may perform optical character recognition for handwritten text. Text recognition component 110 may be a client-based application or may be a combination of a client component and a server component. In some implementations, text recognition component 110 may execute entirely on the client computing device such as a tablet computer, a smart phone, a notebook computer, a camera, a video camera, or the like. Alternatively, a client component of text recognition component 110 executing on a client computing device may receive a document image and transmit it to a server component of text recognition component 110 executing on a server device that performs the text recognition. The server component of text recognition component 110 may then return a list of symbols to the client component of text recognition component 110 executing on the client computing device for storage or to provide to another application. In other implementations, text recognition component 110 may execute on a server device as an Internet-enabled application accessible via a browser interface. The server device may be represented by one or more computer systems such as one or more server machines, workstations, mainframe machines, personal computers (PCs), etc.

Referring to FIG. 1A, text recognition component 110 may include, but is not limited to, image receiver 101, image segmenter module 102, hypotheses module 103, grapheme recognizer module 104, confidence score module 105, spacing and translation module 106, and correction module 107. One or more of components 101-107, or a combination thereof, may be implemented by one or more software modules running on one or more hardware devices.

Image receiver 101 may receive an image from various sources such as a camera, a computing device, a server, a handheld device. The image may be a document file, or a picture file with visible text. The image may be derived from various media (such as hand printed paper documents, banners, posters, signs, billboards, and/or other physical objects with visible texts on one or more of their surfaces. In one embodiment, the image may be pre-processed by applying one or more image transformation to the received image, e.g., binarization, size scaling, cropping, color conversions, etc. to prepare the image for text recognition.

Image segmenter module 102 may segment the received image into fragment images and then into grapheme images. The fragment images or grapheme images may be segmented by visual spacings or gaps in a line of text in the image. Hypotheses module 103 may generate different variants or hypotheses to segment a line of text into fragment image constituents, and a fragment image into one or more grapheme constituents. Grapheme recognizer module 104 may perform recognition for a grapheme image using neural network models 162 (as part of data store 160). Confidence score module 105 may determine a confidence score for a hypothesis based on the recognized grapheme. The confidence score may be a fragmentation confidence score (confidence for a fragment/word) or a classification confidence score (confidence for a symbol/character). Spacing and translation module 106 may add spaces (if necessary) to the grapheme and translate the grapheme into character symbols. After the fragments in the text are recognized, correction module 107 may correct certain parts of the text taken into account a context of the text. The correction may be performed by verifying the character symbols with dictionary/morphological/syntactic rules 161. Although modules 101-107 are shown separately, some of modules 101-107, or functionalities thereof, may be combined together.

FIG. 1B depicts a high level system diagram of interactions of the modules 101-107 according to one embodiment. For example, image receiver 101 may receive image 109. The outputs of image receiver 101 are input to subsequent modules 102-107 to generate symbols 108. Note that, modules 101-107 may be processed sequentially or in parallel. For example, one instance of image segmenter module 102 may process image 109, while several instances of grapheme recognizer module 104 may process several graphemes in parallel, e.g., a number of hypotheses for fragments and/or graphemes may be processed in parallel.

Figure 2:
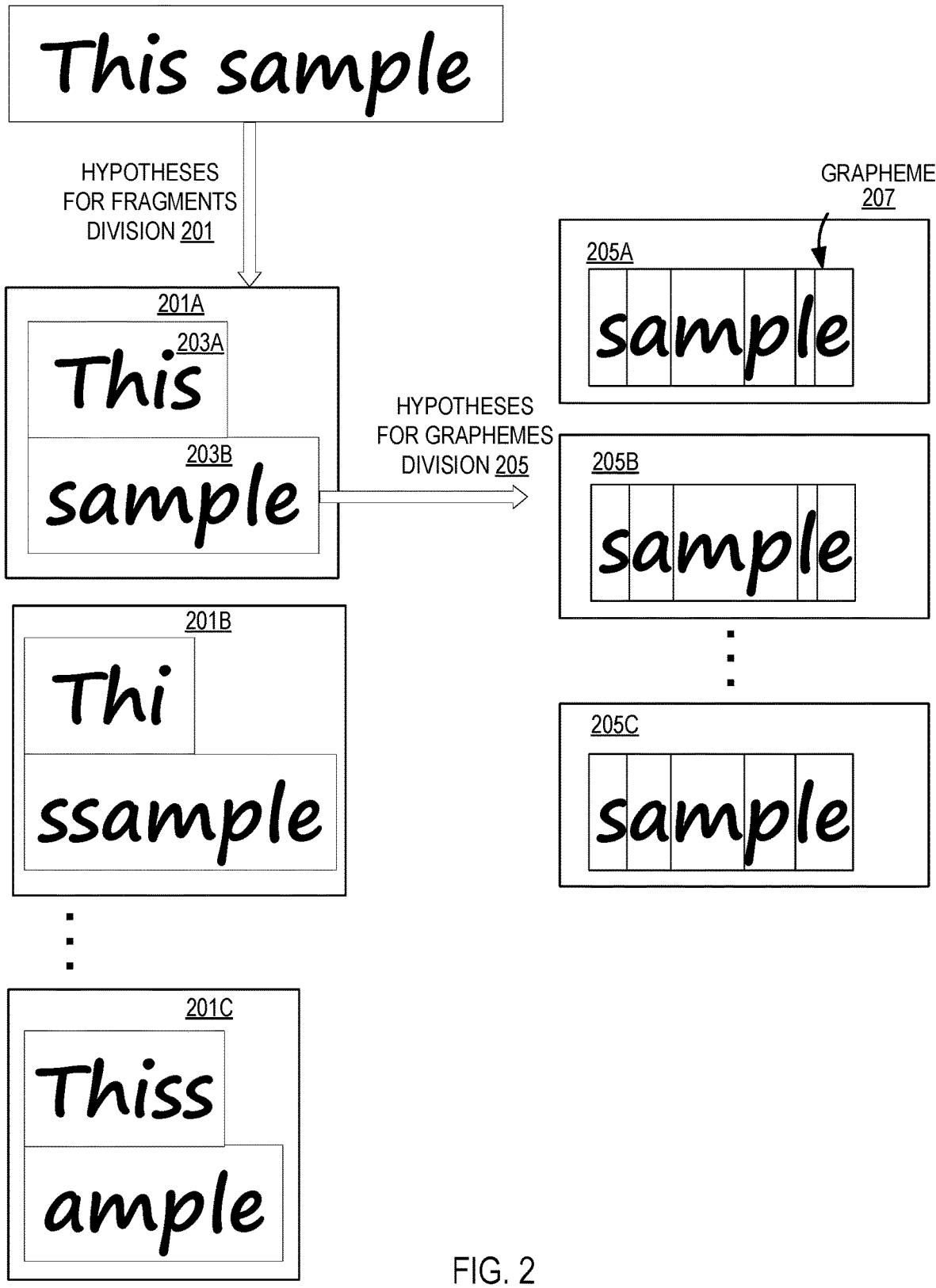
FIG. 2 illustrates an example of an image, fragment images, and grapheme images in accordance with one or more aspects of the present disclosure.

FIG. 2 illustrates an example of an image, fragment images, and grapheme images in accordance with one or more aspects of the present disclosure. Referring to FIGS. 1-2, image 109 may be a binarized image with a line of text "This sample" in the English language. In one embodiment, segmentation module 102 of FIGS. 1A-1B segments image 109 into hypotheses (or variants) 201A-C using a linear division graph. A linear division graph is a graph with markings of all division points. I.e., if there are several ways to divide a string into words, and words into letters, all possible division points are marked and a piece of the image between two marked points is considered a candidate letter (or word). Each of hypotheses 201 can be a variation of how many division points there are and/or where to place these division points to divide the line of text into one or more fragment images. Here, hypothesis 201A divides the line of text into two fragment images 203A-B, e.g., "This" and "sample". The segmentation may be performed based on visible vertical spacings/gaps in the line of text.

The segmentation module 102 may further segment a fragment images 203B into hypotheses (or variants) 205A-C, where hypothesis 205A is a single variation to divide fragment image 203B into a plurality of grapheme images 207. Here, the segmentation points (or division points) may be determined based on gaps in the fragment image. In some cases, the gaps are vertical gaps or slanted gaps (slanted at a particular angle of the handwriting) in the fragment image. In another embodiment, the division points may be determined based on areas of low pixel distributions of a vertical (or slanted) pixel profile of the fragment image. In some other embodiments machine learning may be used for segmentation.

In another embodiment, a hypothesis for division of graphemes may be evaluated for a fragmentation confidence score and the fragment that defined the hypothesis with the highest fragmentation confidence score is picked as the final fragment. In one embodiment, constituents of the line of text (e.g., fragments) or constituents the fragment images (e.g., graphemes) may be stored in a linear division graph data structure. Different paths of the linear division graph data structure may then be used to enumerate one or more hypotheses (or variations or combinations) of fragments/graphemes based on the segmentation/division points.

Referring to FIG. 2, in a scenario, hypotheses module 103 may generate three hypotheses 201A-C for the fragment divisions. For fragment 203B, e.g., "sample", hypotheses module 103 generate hypotheses 205A-C, e.g., "s-a-m-p-l-e", "s-a-mp-l-e", and "s-a-m-p-le", where '-' represents the identified visual gaps or potential dividing gaps between the one or more graphemes. As depicted in FIG. 2, in this example, hypotheses 205B and 205C represents variants where some symbols are "glued" together, i.e., i.e., a grapheme image with two or more symbols with no perceivable visual gaps in between. Note that the glued grapheme images would be discarded by grapheme recognition module 104 as described further below.

Figure 3:
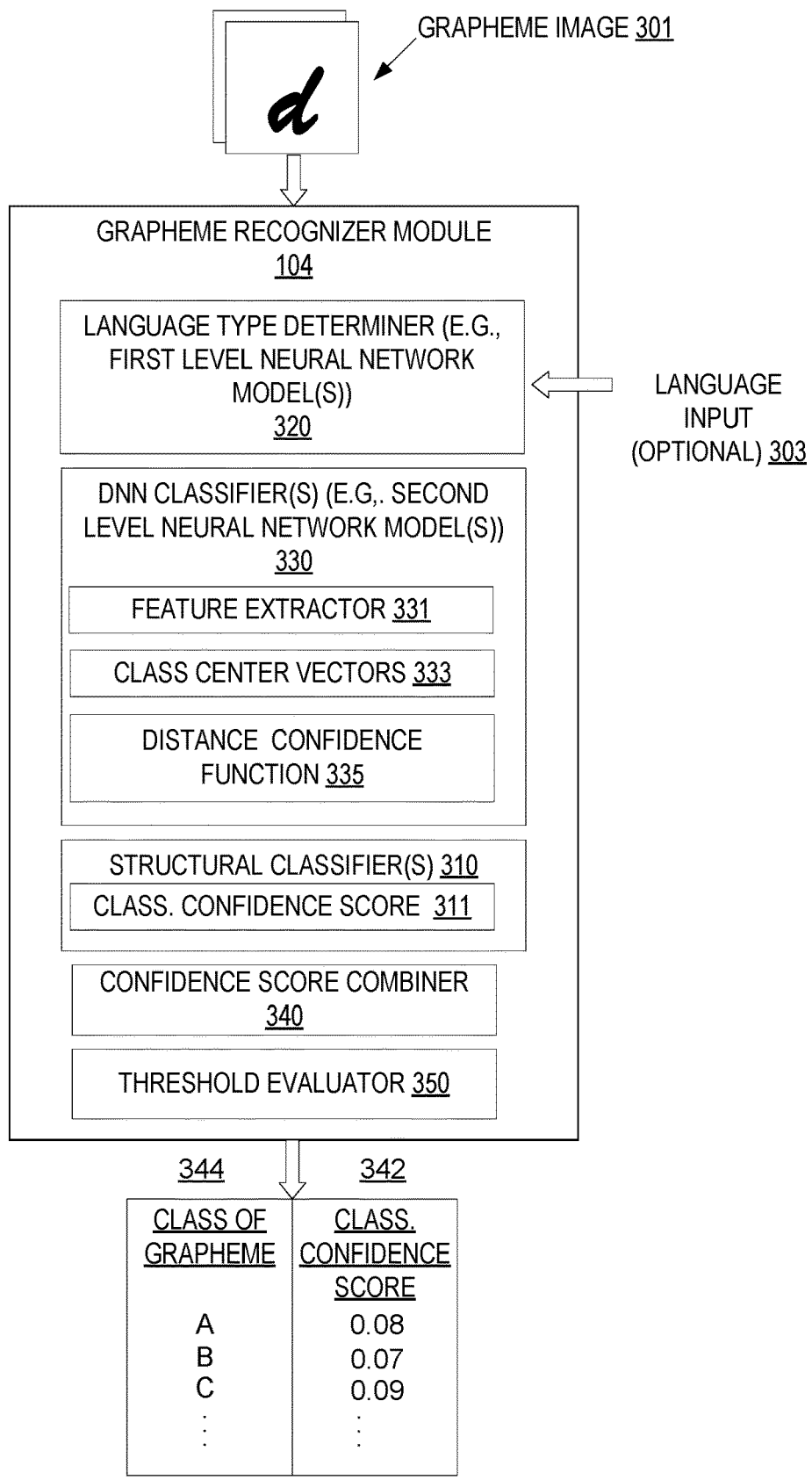
FIG. 3 illustrates a block diagram of a grapheme recognizer module in accordance with one or more aspects of the present disclosure.

FIG. 3 illustrates a block diagram of a grapheme recognizer module in accordance with one or more aspects of the present disclosure. Grapheme recognizer module 104 may translate an input grapheme image 301 to an output symbol. In one embodiment, grapheme recognizer module 104 includes language type determiner (e.g., first level neural network model(s)) 320, deep neural network (DNN) classifier (e.g., second level neural network model(s)) 330, structural classifiers 310, confidence score combiner 340, and threshold evaluator 350. One or more of components 320-350, or a combination thereof, may be implemented by one or more software modules running on one or more hardware devices.

Language type determiner (e.g., first level neural network model(s)) 320 may determine a group of grapheme symbols (e.g., a set of characters for a particular language group or alphabets) to search for the grapheme image 301. In one embodiment, the first level neural network model is used to classify the grapheme image 301 into one or more languages within a group of languages. The first level neural network model may be a convolutional neural network model trained to classify a grapheme image as one of group of languages. In another embodiment, the language is specified by a user operating the text recognition system 100, e.g., language input 303. In another embodiment, the language is specified by a previously identified language for a neighboring grapheme and/or fragment. Deep neural network (DNN) classifier (e.g., the second level neural network model(s)) 330 may classify the grapheme image as a symbol of the chosen alphabet and associate a classification confidence score with the hypothesis associating the grapheme with the symbol. The DNN classifiers 330 may use a second level neural network model that is trained for the particular language for the classification. Structural classifiers 310 may classify the grapheme image to a symbol with a classification confidence score based on a rule-based classification system. Confidence score combiner 340 may combine the classification confidence scores (e.g., a modified classification confidence score) for the grapheme image based on a classification confidence score for a neural network classification and a classification confidence score for a structural classification. In one embodiment, the combined classification confidence score is a linear combination (such as a weighted sum) of the classification confidence scores of the two classifications. In another embodiment, the combined classification confidence score is an aggregate function (such as minimum, maximum, or average) of the classification confidence scores of the two classifications. Threshold evaluator 350 may evaluate the combine classification confidence score for a particular grapheme. If the combined classification confidence scores are below a predetermined threshold (e.g., glued graphemes, invalid graphemes, or graphemes that belong to a different language, etc.). The grapheme may be disregarded for further consideration.

Referring to FIG. 3, in one embodiment, DNN classifiers 330 may include feature extractor 331 that generates a feature vector corresponding to the input grapheme image 301. DNN classifiers 330 may transform the feature vector into a vector of class weights, such that each weight would characterize the probability of the input image 301 to be a grapheme class of a set of classes (e.g., a set of alphabet characters/symbols A, B, C, etc.), where the grapheme class is identified by the index of the vector element within the vector of class weights. DNN classifiers 330 may than apply a normalized exponential function to transform the vector of class weights into a vector of probabilities, such that each probability would characterize a hypothesis of the input grapheme image 301 representing an instance of a certain grapheme class of a set of classes, where the grapheme class is identified by the index of the vector element within the vector of probabilities. In an illustrative example, the set of classes may be represented by a set of alphabet characters A, B, C, etc., and thus each probability of the set of probabilities produced by DNN classifiers 330 would characterize a hypothesis of the input image representing the corresponding character of the set of alphabet characters A, B, C, etc.

However, as noted herein above, such probabilities may be unreliable, e.g., for glued graphemes, invalid graphemes, graphemes that belong to a different language, etc. To alleviate such unreliability, DNN classifiers 330 may include distance confidence function 335 which computes distances, in the image feature space, between class center vectors 333 (class centers for a particular second level neural network model may be stored as part of class center vectors 163 in data store 160 of FIG. 1A) and the feature vector of the input image 301, and transforms the computed distances into a vector of classification confidence scores, such that each classification confidence score (e.g., selected from the range of 0-1) reflects the level of confidence of the hypothesis of the input grapheme image 301 representing an instance of a certain class of the set of classes, where the grapheme class is identified by the index of the vector element within the vector of classification confidence scores. In an illustrative example, the set of classes may correspond to a set of alphabet characters (such as A, B, C, etc.), and thus the confidence function 335 may produce a set of classification confidence scores, such that each classification confidence score would characterize a hypothesis of the input image representing the corresponding character of the set of alphabet characters. In one embodiment, the classification confidence score computed for each class (e.g., alphabet character) by confidence function 335 may be represented by the distance between the feature vector of the input image 301 and the center of the respective class.

Referring to FIG. 3, structural classifiers 310 may classify the grapheme image to a set of symbols and generate a classification confidence score for a corresponding symbol using a ruled-based classification system. Structural classifiers 310 may include a structural classifier for a corresponding class (symbol) of the set of classes (symbols). A structural classifier may analyze the structure of a grapheme image 301 by decomposing the grapheme image 301 into constituent components (e.g., calligraphic elements: lines, arcs, circles, and dots, etc.). The constituent components (or calligraphic elements) are then compared with predefined constituent components (e.g., calligraphic elements) for a particular one of the set of classes/symbols. If a particular constituent component exists, a combination, e.g., weighted sum, for the constituent component can be used to calculate a classification confidence score for the classification. In one embodiment, the structural classifier includes a linear classifier. A linear classifier classifies a grapheme based on a linear combination of the weights of its constituent components. In another embodiment, the structural classifier includes a bayesian binary classifier. Here, each constituent component correspond to a binary value (i.e. zero or one) that contributes to the classification confidence score. Based on the structural classification, a classification confidence score is generated for each class (e.g., alphabet character) of a set of classes.

Next, confidence score combiner 340 may combine the classification confidence scores for each class of the set of classes 344 for the DNN classifiers and the structural classifier to generate (combined) classification confidence score 342 for the set of classes 344. In one embodiment, the combined classification confidence score is a weighted sum of the classification confidence scores of the DNN classifiers and the structural classifier. In another embodiment, the combined classification confidence score is a min, max, or average of the classification confidence scores of the two classifiers. The class with a highest combined classification confidence score and the corresponding combined classification confidence score may be selected as output of the grapheme recognizer module 104.

In one embodiment, threshold evaluator 350 determines whether the combined classification confidence score is below a predetermined threshold. In response to determining the combined classification confidence score is below the predetermined threshold, grapheme recognizer module 104 may return an error code (or a nullified classification confidence score) indicating that the input image does not depict a valid grapheme (e.g., glued grapheme and/or a grapheme from a different language may be present in the input image).

Figure 4:
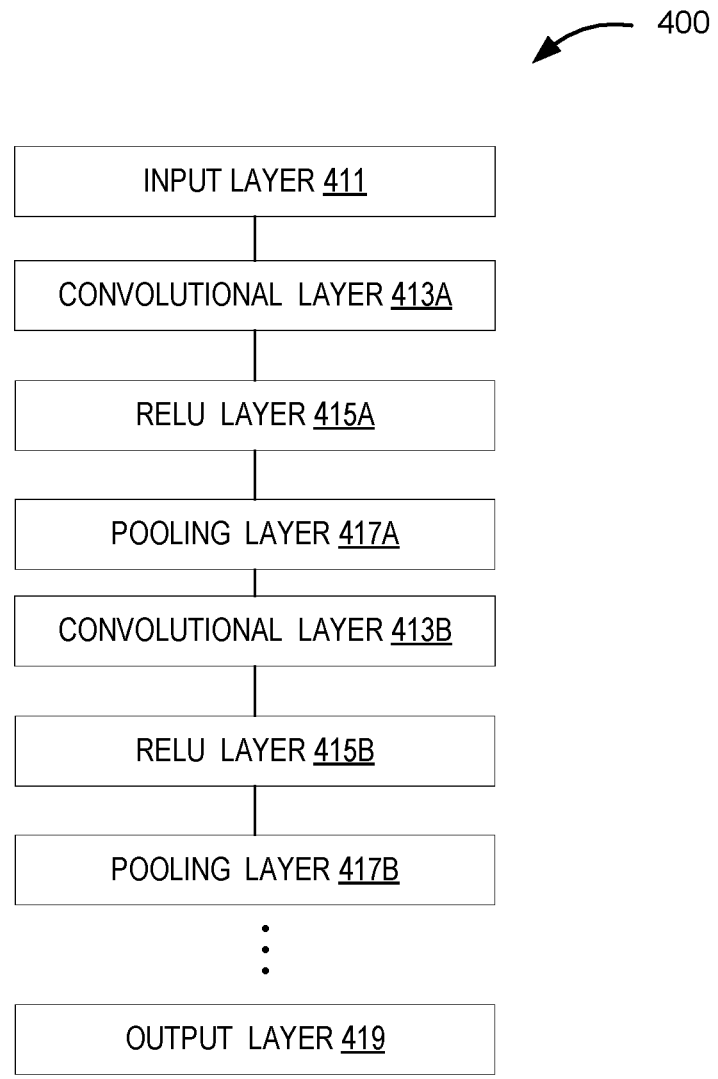
FIG. 4 illustrates a block diagram of a first level neural network in accordance with one or more aspects of the present disclosure.

In an illustrative example, a first level neural network of language type determiner 320 may be implemented as a convolutional neural network having a structure schematically illustrated by FIG. 4. The example convolutional neural network 400 may include a sequence of layers of different types, such as convolutional layers, pooling layers, rectified linear unit (ReLU) layers, and fully connected layers, each of which may perform a particular operation in recognizing a line of text in an input image. A layer's output may be fed as the input to one or more subsequent layers. As illustrated, convolutional neural network 400 may include an input layer 411, one or more convolutional layers 413A-413B, ReLU layers 415A-415B, pooling layers 417A-417B, and an output layer 419.

In some embodiments, an input image (e.g., grapheme image 301 of FIG. 3) may be received by the input layer 411 and may be subsequently processed by a series of layers of convolutional neural network 400. Each of the convolution layers may perform a convolution operation which may involve processing each pixel of an input fragment image by one or more filters (convolution matrices) and recording the result in a corresponding position of an output array. One or more convolution filters may be designed to detect a certain image feature, by processing the input image and yielding a corresponding feature map.

The output of a convolutional layer (e.g., convolutional layer 413A) may be fed to a ReLU layer (e.g., ReLU layer 415A), which may apply a non-linear transformation (e.g., an activation function) to process the output of the convolutional layer. The output of the ReLU layer 415A may be fed to the pooling layer 417A, which may perform a subsampling operation to decrease the resolution and the size of the feature map. The output of the pooling layer 417A may be fed to the convolutional layer 413B.

Processing of the original image by the convolutional neural network 400 may iteratively apply each successive layer until every layer has performed its respective operation. As schematically illustrated by FIG. 4, the convolutional neural network 400 may include alternating convolutional layers and pooling layers. These alternating layers may enable creation of multiple feature maps of various sizes. Each of the feature maps may correspond to one of a plurality of input image features, which may be used for performing grapheme recognition.

In some embodiments, the penultimate layer (e.g., the pooling layer 417B (a fully connected layer)) of the convolutional neural network 400 may produce a feature vector representative of the features of the original image, which may be regarded as a representation of the original image in the multi-dimensional space of image features.

The feature vector may be fed to the fully-connected output layer 419, which may generate a vector of class weights, such that each weight would characterize the degree of association of the input image with a grapheme class of a set of classes (e.g., a set of languages). The vector of class weights may then be transformed, e.g., by a normalized exponential function, into a vector of probabilities, such that each probability would characterize a hypothesis of the input grapheme image representing an instance of a certain grapheme class of a set of classes (e.g., English language).

While FIG. 4 illustrates a certain number of layers of the convolutional neural network 400, convolutional neural networks employed in various alternative implementations may include any suitable numbers of convolutional layers, ReLU layers, pooling layers, batch normalization, dropout, and/or any other layers. The convolutional neural network 400 may be trained by forward and backward propagation using images from a training dataset, which includes images of graphemes and respective class identifiers (e.g., characters of particular languages) reflecting the correct classification of the images.

Figure 5:
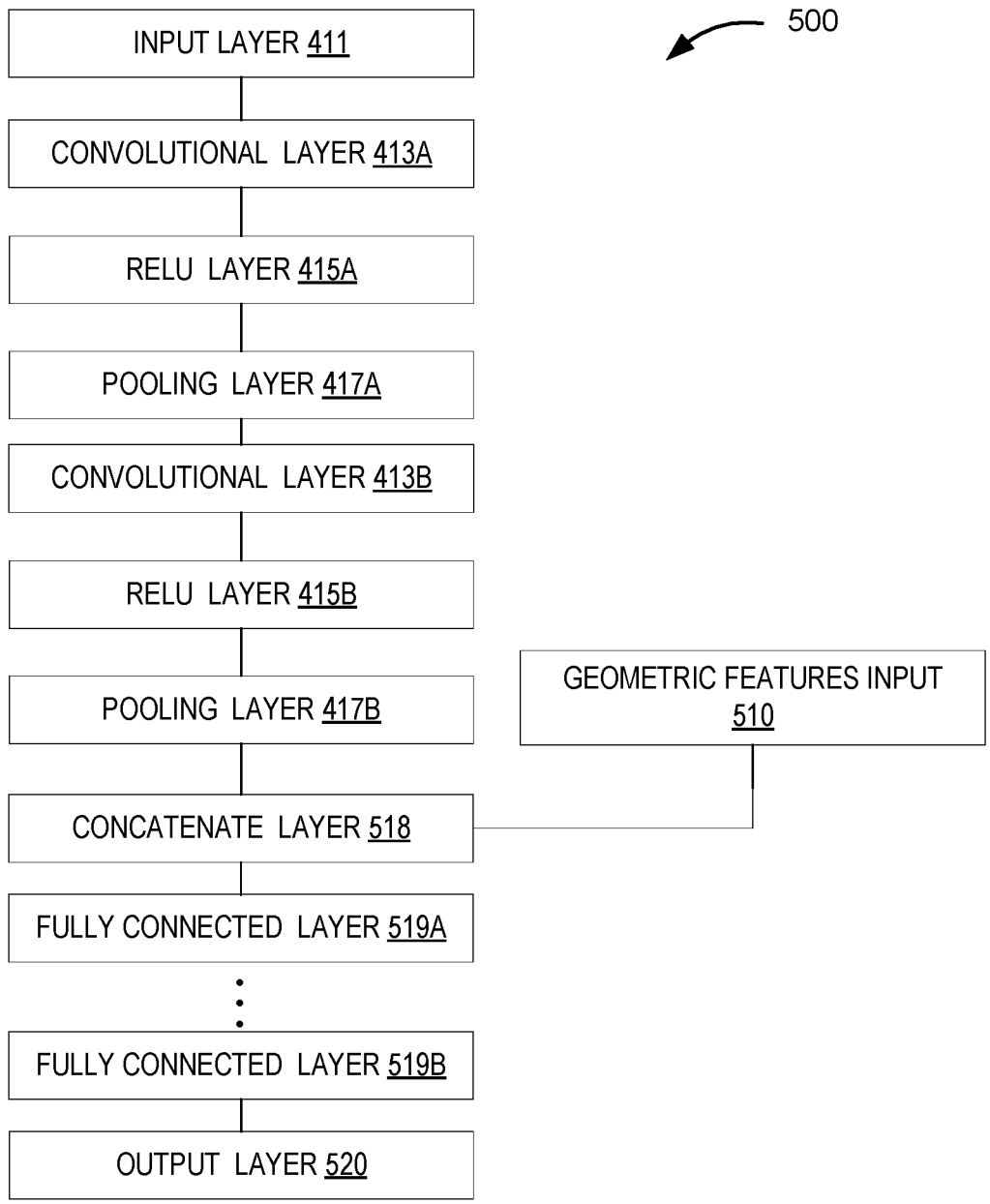
FIG. 5 illustrates a block diagram of a second level neural network in accordance with one or more aspects of the present disclosure.

FIG. 5 illustrates a block diagram of the second level neural network in accordance with one or more aspects of the present disclosure. The second level neural network (as part of DNN classifiers 330 of FIG. 3) may be implemented as a modified convolutional neural network 500. The example modified convolutional neural network 500 may be similar to convolutional neural network 400 and may include a sequence of layers of different types, such as convolutional layers, pooling layers, rectified linear unit (ReLU) layers, and fully connected layers, each of which may perform a particular operation in recognizing the text in an input image.

Referring to FIG. 5, the output of penultimate (or fully connected) pooling layer 417B may be viewed as performing the functions of a feature extractor, e.g., feature extractor 331 of FIG. 3. In one embodiment, network 500 includes a concatenation layer 518 which concatenates geometric features input 510 of the input image 301 with the output features of pooling layer 417B. In one embodiment, the geometric features of the input image 301 may include geometric features of the grapheme in the grapheme image. Such geometric features may include: ratio of pixels of a width of the grapheme image to a height of the grapheme image, a ratio of a base line (bottom) of a symbol in the grapheme image to the height of the grapheme image, and a ratio of height (top) of symbol in the grapheme image to the height of the grapheme image. Here, the geometric features may be used to distinguish between commas and apostrophes. The output for concatenate layer 518 is then fed through one or more fully connected layers 519A-B followed by output layer 520.

Output layer 520 may correspond to a vector of class weights, where each weight would characterize the degree of association of the input image with a grapheme class of a set of classes (e.g., a set of alphabet characters A, B, C, etc.). The vector of class weights may then be transformed, e.g., by a normalized exponential function, into a vector of probabilities, such that each probability would characterize a hypothesis of the input grapheme image representing an instance of a certain grapheme class of a set of classes.

In some embodiments, the vectors of class weights and/or probabilities produced by fully-connected output layer 520 may be used in network training or inferencing. For example, while in operation the feature vector produced by the penultimate layer (e.g., the pooling layer 417B) of the convolutional neural network 500 may be fed to the above-described confidence function 335, which produces a vector of classification confidence scores, such that each classification confidence score (e.g., selected from the range of 0-1) reflects the level of confidence of the hypothesis of the input grapheme image representing an instance of a certain class of the set of classes. In some embodiments, the classification confidence score computed for each class of the set of classes by the confidence function may be represented by the distance between the feature vector of the input image and the center of the respective class.

The convolutional neural network 500 may be trained by forward and backward propagation based on a loss function and images from a training dataset, which includes images of graphemes and respective class identifiers (e.g., characters of alphabets, A, B, C, . . . ) reflecting the correct classification of the images. For example, a value of the loss function may be computed (forward propagation) based on the observed output of the convolutional neural network (i.e., the vector of probabilities) and the desired output value specified by the training dataset (e.g., the grapheme which is in fact shown by the input image, or, in other words the correct class identifier). The difference between the two values are backward propagated to adjust weights in the layers of convolutional neural network 500.

In one embodiment, the loss function may be represented by the Cross Entropy Loss (CEL), which may be expressed as follows:

$$CEL = \sum_i -\ln p_{j_i}$$

where i is the number of input image in the batch of input images, $j_i$ is the correct class identifier (e.g., grapheme identifier) for the i-the input image, and $P_{ji}$ is the probability produced by the neural network for i-th input image representing the j-th class (i.e., for the correct classification of the i-th input image).

The summing is performed by all input images from the current batch of input images. The identified classification error is propagated back to the previous layers of the convolutional neural network, in which the network parameters are adjusted accordingly. This process may be repeated until the value of the loss function would stabilize in the vicinity of a certain value or fall below a predetermined threshold. The neural network trained using the CEL loss function would place the instances of the same class along a certain vector in the feature space, thus facilitating efficient segregation of instances of different classes.

While CEL loss function may be adequate for distinguishing images of different graphemes, it may not always produce satisfactory results in filtering out invalid image graphemes. Accordingly, the Center Loss (CL) function may be employed in addition to the CEL function, thus compacting the representation of each class in the feature space, such that all instances of a given class would be located within a relatively small vicinity of a certain point, which would thus become the class center, while any feature representation of an invalid grapheme image would be located relatively further away (e.g., at a distance exceeding a pre-defined or dynamically configured threshold) from any class center.

In one embodiment, the Center Loss function may be expressed as follows:

$$CL = \sum_i \|F_i - C_j\|_2$$

where i is the number of input image in the batch of input images, $F_i$ is the feature vector of the i-th input image, j is the correct class identifier (e.g., grapheme identifier) for the i-the input image, and $C_j$ is the vector of the center of the j-th class.

The summing is performed by all input images from the current batch of input images.

The center class vectors $C_j$ may be computed as the average of all features of the images which belong to the j-th class. As schematically illustrated by FIG. 3, the computed center class vectors 333 may be stored in the memory accessible by the grapheme recognizer module 104.

In one embodiment, DNN classifiers 330 may be trained using a loss function represented by a linear combination of the CEL and CL functions, assuming zeroes as the initial values of the center class vectors. The values of the center class vectors may be re-computed after processing each training dataset (i.e., each batch of input images).

In another embodiment, DNN classifiers 330 may initially be trained using the CEL function, and initial values of the center class vectors may be computed after completing the initial training stage. The subsequent training may utilize a linear combination of the CEL and CL functions, and the values of the center class vectors may be re-computed after processing each training dataset (i.e., each batch of input images).

Employing a combination of CEL and CL functions for neural network training would produce compact representation of each class in the feature space, such that all instances of a given class would be located within a relatively small vicinity of a certain point, which would thus become the class center, while any feature representation of an invalid grapheme image would be located relatively further away (e.g., at a distance exceeding a pre-defined or dynamically configured threshold) from any class center.

In one embodiment, the loss function L may be represented by a linear combination of CEL and CL functions, which may be expressed as follows:

$$L = CEL + \alpha * CL$$

where $\alpha$ is a weight coefficient the value of which may be adjusted to throttle the CL impact on the resulting loss function value, thus avoiding over-narrowing the feature range for instances of a given class.

The confidence function may be designed to ensure that the grapheme recognizer would assign low classification confidence scores to invalid grapheme images. Accordingly, the confidence of associating a given image with a certain class (e.g., recognizing a certain grapheme in the image) would thus reflect the distance between the feature vector of the image and the center of the class, which may be expressed as follows:

$$d_k = \|F - C_k\|_2$$

where $d_k$ is the distance between the center $C_k$ of k-th class and the feature vector F of a given image.

In one embodiment, distance confidence function 335 may be represented by a monotonically decreasing function of the distance between the class center and the feature vector of an input image in the space of image features. Thus, the further the feature vector is located from the class center, the less would be the classification confidence score assigned to associating the input image with this class.

In one embodiment, distance confidence function 335 may be provided by a piecewise-linear function of the distance. The distance confidence function 335 may be performed by selecting certain classification confidence scores $q_i$ and determining the corresponding distance values $d_i$ that would minimize the number of classification errors produced by the classifier processing a chosen validation dataset (which may be represented, e.g., by a set of document images (e.g., images of document pages) with associated metadata specifying the correct classification of the graphemes in the image). In some embodiments, the classification confidence scores $q_i$ may be chosen at equal intervals within the valid range of classification confidence scores (e.g., 0-1). Alternatively, the intervals between the classification confidence scores $q_i$ may be chosen to increase while moving along the classification confidence score range towards to lowest classification confidence score, such that the intervals would be lower within a certain high classification confidence score range, while being higher within a certain low classification confidence score range.

Figure 6:
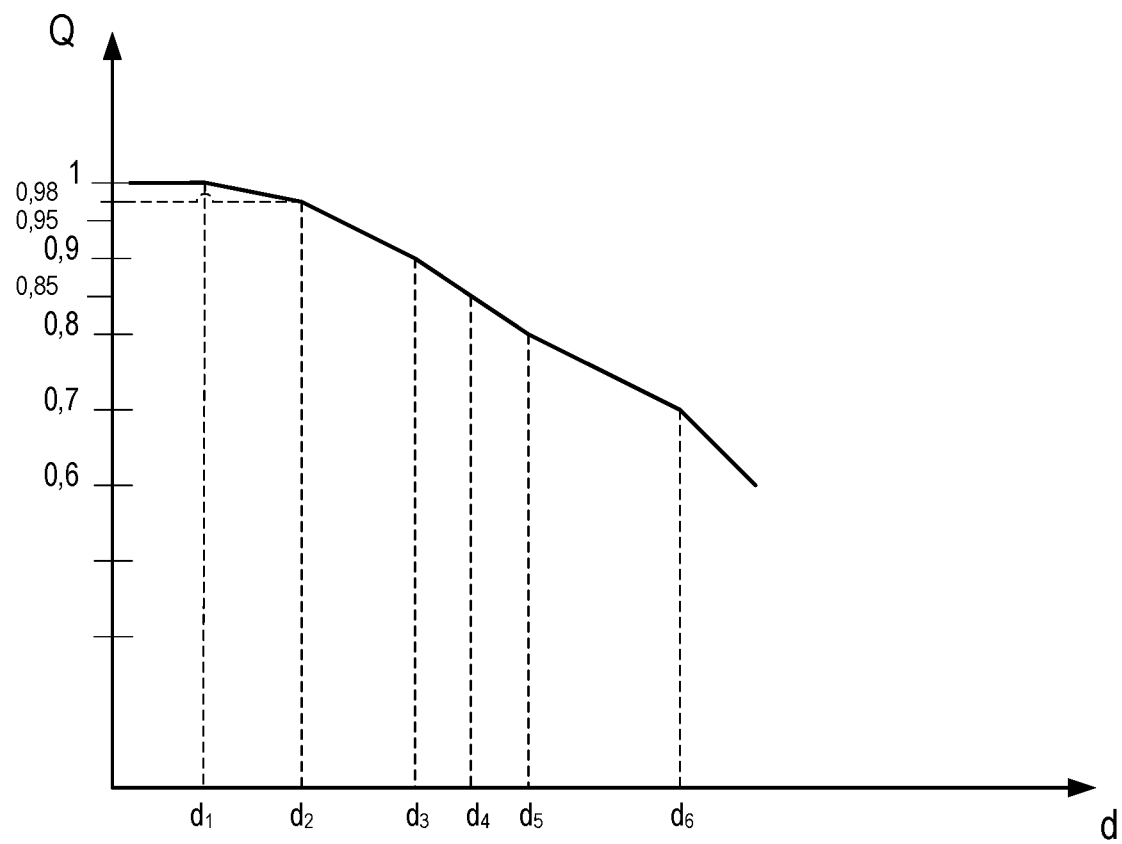
FIG. 6 schematically illustrates an example confidence function Q(d) implemented in accordance with one or more aspects of the present disclosure.

FIG. 6 schematically illustrates an example confidence function Q(d) implemented in accordance with one or more aspects of the present disclosure. As schematically illustrated by FIG. 6, the classification confidence scores $q_k$ may be chosen at pre-selected intervals within the valid range of classification confidence scores (e.g., 0-1), and then the corresponding values $d_k$ may be determined. If higher sensitivity of the function to its inputs in the higher range of function values is desired, the $q_k$ values within a certain high classification confidence score range may be selected at relatively small intervals (e.g., 1; 0.98; 0.95; 0.9; 0.85; 0.8; 0.7; 0.6; . . . ). The distances $\Delta_k$ between neighboring $d_k$ values (e.g., $d_k = d_{k-1} + \Delta_k$) may then be determined by applying optimization methods, such as the differential evolution method. The confidence function Q(d) may then be constructed as a piecewise linear function connecting the computed points $(d_k, q_k)$.

In some embodiments, the classification confidence scores may only be determined for a subset of the classification hypotheses which the classifier has associated with high probabilities (e.g., exceeding a certain threshold).

Using the above-described loss and confidence functions ensures that, for the majority of invalid grapheme images, low classification confidence scores would be assigned to hypotheses associating the input images with all possible graphemes. A clear advantage of applying the above-described loss and confidence functions is training the classifier without requiring the presence of negative samples in the training dataset, since, as noted herein above, all possible variations of invalid images may be difficult to produce, and the number of such variations may significantly exceed the number of valid graphemes.

In some embodiments, the DNN classifiers 330 trained using the above-described loss and confidence functions may still fail to filter out a small number of invalid grapheme images. For example, a hypothesis associating an invalid grapheme image with a certain class (i.e., erroneously recognizing a certain grapheme within the image) would receive a high classification confidence score if the feature vector of the invalid grapheme image is located within a relatively small vicinity of a center of the class. While the number of such errors tends to be relatively small, the above-described loss function may be enhanced in order to filter out such invalid grapheme images.

In one embodiment, the above-described loss function represented by a linear combination of the CEL function and the CL function may be enhanced by introducing a third term, referred herein as Close-to-Center Penalty Loss (CCPL) function, which would cause the feature vectors of known types of invalid images be removed from the centers of all classes. Accordingly, the loss function may be expressed as follows:

$$L = CEL + \alpha * CL + \beta * CCPL$$

Training the second level neural network using the loss function with the CCPL may involve iteratively processing batches of input images, such that each batch includes positive samples (images of valid graphemes) and negative samples (invalid grapheme images). In certain implementations, CEL+α*CL term may be only computed for positive samples, while β*CCPL term may be only computed for negative samples.

In an illustrative example, the training dataset may include the negative samples represented by real invalid grapheme images which were erroneously classified as valid images and assigned classification confidence scores exceeding a certain pre-determined threshold. In another illustrative example, the training dataset may include the negative samples represented by synthetic invalid grapheme images.

The CCPL function, which is computed for negative training samples, may be expressed as follows:

$$CCPL = \sum_i \sum_j \max(0; A - \|F_j^{neg} - C_i\|_1)$$

where $F_j^{neg}$ is the feature vector for j-th negative training sample, $C_i$ is the center of the i-th class, and A is a pre-defined or adjustable parameter defining the size of the neighborhood of the class center (i.e., the distance to the class center) in the space of image features, such that the feature vectors located within the neighborhood are penalized, while the penalty would not be applied to the feature vectors located outside of the neighborhood.

Therefore, if the feature vector of a negative sample is located within a distance not exceeding the value of parameter A from the center of the i-th class, then the value of the CCPL function is incremented by that distance. Training the DNN classifiers involves minimizing the CCPL value. Accordingly, the trained DNN classifiers would, for an invalid grapheme image, yield a feature vector which is located outside of immediate vicinities of the centers of valid classes. In other words, the classifier is trained to distinguish between valid graphemes and invalid grapheme images.

Referring to FIGS. 3 and 5, in one embodiment, a particular second level neural network 500 (as part of DNN classifiers 330) is trained for a particular language group to generate a second level neural network model for that particular language (e.g., set of symbols), where a corresponding second level neural network model is selected corresponding to the particular trained language when the language is specified. As noted herein above, the second level neural network models trained by the methods described herein may be utilized for performing various image classification tasks, including but not limited to the text recognition.

Referring to FIGS. 3, once the DNN classifiers 330 is trained, a particular second level neural network model (as part of DNN classifiers 330) may be used to classify a grapheme image to a set of classes and to generate classification confidence scores for the set of classes. Combiner 340 may then combine the classification confidence scores with classification confidence scores of a structural classified. Evaluator 350 may evaluator (or discard) for a best class of grapheme using the combined classification confidence score. Grapheme recognizer module 104 may iterate through the grapheme images of a hypothesis and generate a (combined) classification confidence score for each grapheme image.

Referring again to FIGS. 1A-B, in one embodiment, once the (combined) classification confidence scores are determined for each grapheme image within a hypothesis, confidence score module 105 may combine the classification confidence scores of all the grapheme image within a hypothesis to generate a fragmentation confidence score for the particular hypothesis for the graphemes divisions. Among several hypotheses for the grapheme divisions, a hypothesis with the highest fragmentation confidence score is selected as the final hypothesis (denoted as the fragmentation confidence score for the fragment). In one embodiment, the fragmentation confidence scores for each fragment may be combined to determine a final confidence score for a hypothesis, the hypothesis to divide the image with the line of text into its fragment image constituents. Among the several hypotheses for the fragments divisions, a hypothesis with a highest final confidence score is selected as the final hypothesis for the fragments division. In one embodiment, spacing and translation module 106 then translates the final hypothesis for the fragments division to output symbols 108. In one embodiment, the spacing/punctuation adjustment may be applied to the output symbols 108 where necessary using a rule-based algorithm. For example, a period follows the end of a sentence, double spacing is applied in between sentences, etc.

In another embodiment, correction module 107 may further adjust the symbols 108 taking into account a context for the output symbols. For example, a third level deep (convolutional) neural network model may classify the symbols 108 into a number, name, address, email address, date, language, etc. to give context to the symbols 108. In another embodiment, the symbols 108 (or words within the symbols) with the context may be compared with a dictionary, a morphological model, a syntactic model, etc. For example, an ambiguous word (words a confidence below a certain threshold) may be compared with a dictionary definition of neighboring words for a match and the ambiguous word may be corrected in response to a match.

Figure 7:
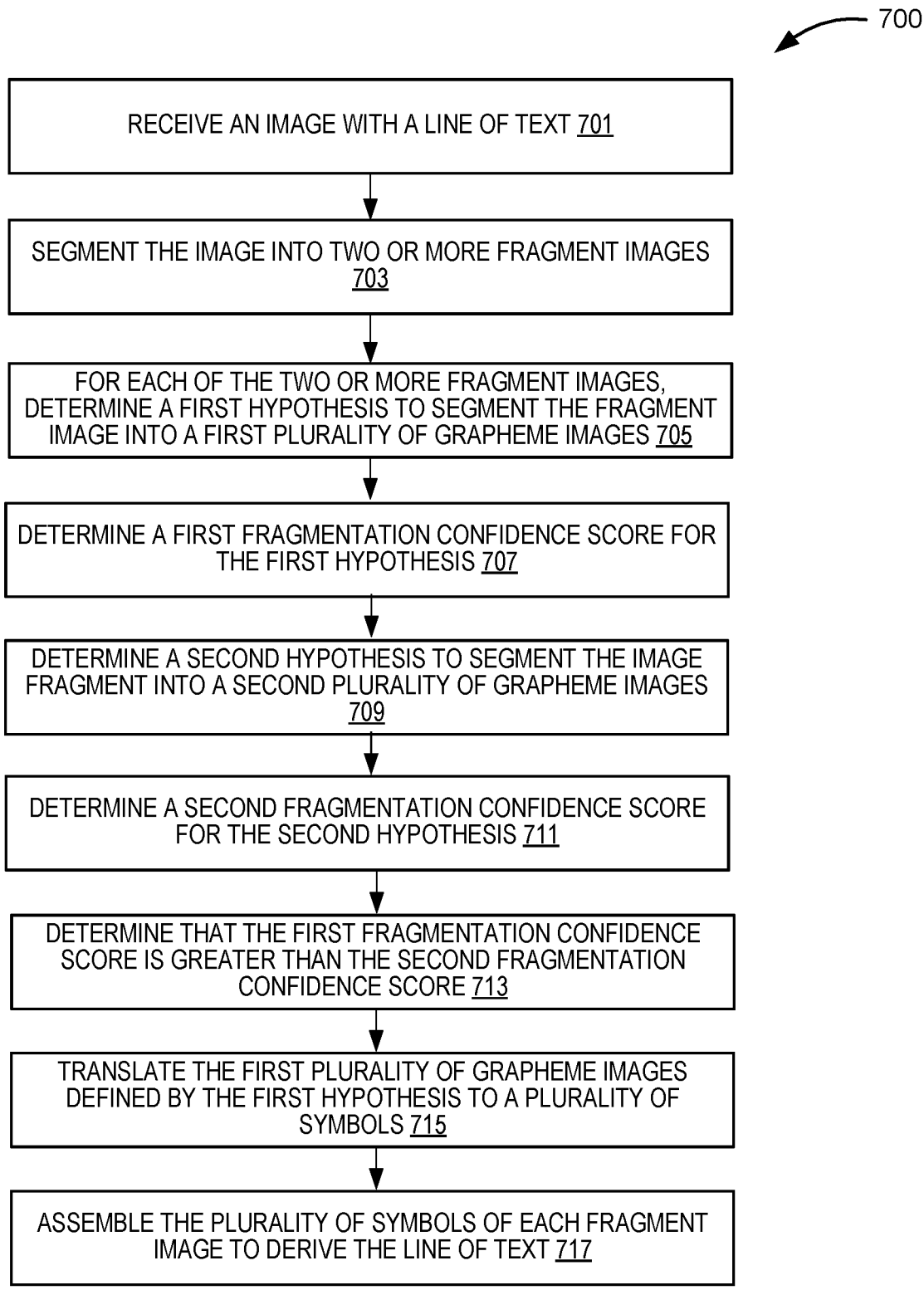
FIG. 7 depicts a flow diagram of a method to recognize a line of text in accordance with one or more aspects of the present disclosure.
Figure 8:
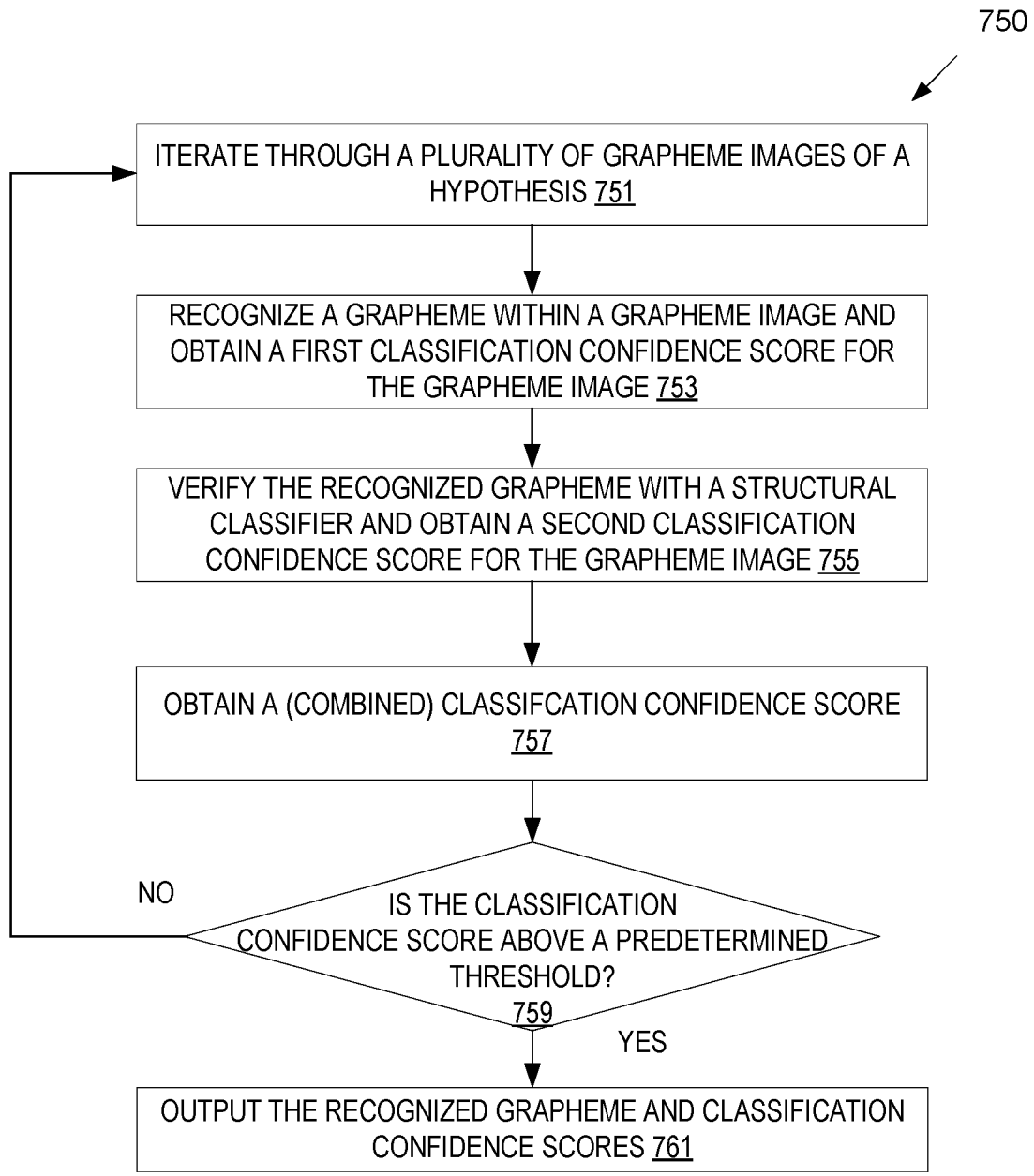
FIG. 8 depicts a flow diagram of a method to recognize a grapheme in accordance with one or more aspects of the present disclosure.

FIGS. 7-8 are flow diagrams of various implementations of methods related to text recognition. The methods are performed by processing logic that may include hardware (circuitry, dedicated logic, etc.), software (such as is run on a general purpose computer system or a dedicated machine), or a combination of both. The methods and/or each of their individual functions, routines, subroutines, or operations may be performed by one or more processors of a computing device (e.g., computing system 800 of FIG. 9) implementing the methods. In certain implementations, the methods may be performed by a single processing thread. Alternatively, the methods may be performed by two or more processing threads, each thread implementing one or more individual functions, routines, subroutines, or operations of the methods. Method 700 may be performed by text recognition system 100 of FIG. 1A, and method 750 may be performed by text recognizer module 104 of FIG. 1A.

For simplicity of explanation, the methods are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 7 depicts a flow diagram of a method to recognize a line of text in accordance with one or more aspects of the present disclosure. At block 701, processing logic receives an image with a line of text. At block 703, processing logic segments the image into two or more fragment images. At block 705, for each of the two or more fragment images, processing logic determines a first hypothesis to segment the fragment image into a first plurality of grapheme images. At block 707, processing logic determines a first fragmentation confidence score for the first hypothesis. At block 709, processing logic determines a second hypothesis to segment the fragment image into a second plurality of grapheme images. At block 711, processing logic determines a second fragmentation confidence score for the second hypothesis. At block 713, processing logic determines that the first fragmentation confidence score is greater than the second fragmentation confidence score. At block 715, processing logic translates the first plurality of grapheme images defined by a first hypothesis to a plurality of symbols. At block 717, processing logic assembles the plurality of symbols of each fragment image to derive the line of text.

In one embodiment, segmenting the image into two or more fragment images is performed based on visual features (or gaps) identified in the line of text. In one embodiment, determining the first fragmentation confidence score further comprises: applying a first level neural network model to one of the first plurality of grapheme images to determine a language grouping for the grapheme image. In another embodiment, processing logic further selects a second level neural network model based on the language grouping, applies the second level neural network model to the grapheme image to determine a classification confidence score for the grapheme image, and determining the first fragmentation confidence score based on classification confidence scores for each of the first plurality of grapheme images.

In one embodiment, a particular second level neural network model corresponds to a particular grouping of graphemes to be recognized, wherein the particular language grouping corresponds to a group of symbols of a particular language.

In one embodiment, processing logic further applies a structural classifier to the grapheme image, determines a modified classification confidence score for the grapheme image based on the structural classification, and determines the first fragmentation confidence score based on modified classification confidence scores for each of the first plurality of grapheme images. In one embodiment, processing logic further determines whether the first fragmentation confidence score is greater than a predetermined threshold, and responsive to determining the first fragmentation confidence score is greater than the predetermined threshold, processing logic translates the first plurality of grapheme images of the first hypothesis to a plurality of symbols.

In some embodiments, a second level neural network model is trained using a loss function, wherein the loss function is represented by a combination of a cross entropy loss function, a center loss function, and/or a close-to-center penalty loss function. In one embodiment, the second level neural network model includes a first input for a grapheme image, a second input for geometric features of the grapheme image, and a concatenate layer to concatenate the geometric features of the grapheme image to an inner layer of the second level neural network model. In one embodiment, processing logic further verifies the plurality of symbols with a morphological, a dictionary, or a syntactical model.

FIG. 8 depicts a flow diagram of a method to recognize a grapheme in accordance with one or more aspects of the present disclosure. At block 751, processing logic iterates through a plurality of grapheme images of a hypothesis. At block 753, processing logic recognizes a grapheme within a grapheme image and obtains a first classification confidence score for the grapheme image. At block 755, processing logic verifies the recognized grapheme with a structural classifier and obtains a second classification confidence score. At block 757, processing logic obtains a (combined) classification confidence score for the recognized graphemes based on the first and the second classification confidence scores. At block 759, processing logic determines whether the classification confidence score is above a predetermined threshold. At block 761, processing logic outputs the recognized graphemes and classification confidence scores for the plurality of grapheme images.

In one embodiment, recognizing a grapheme further comprising recognizing the grapheme using a second level convolutional neural network model. In one embodiment, processing logic assembles the recognized graphemes to derive a line of text.

Figure 9:
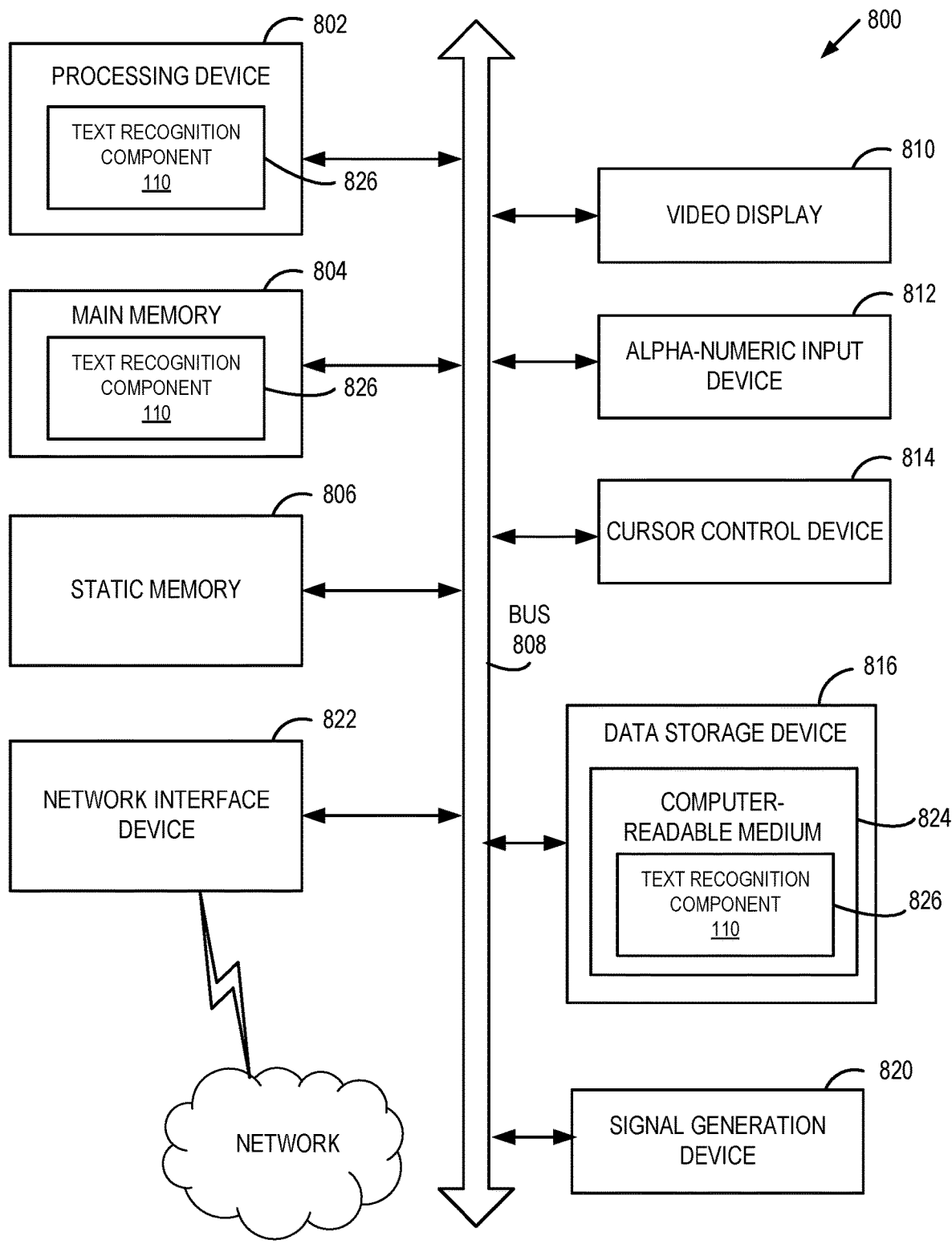
FIG. 9 depicts a block diagram of an illustrative computer system in accordance with one or more aspects of the present disclosure.

FIG. 9 depicts an example computer system 800 which may perform any one or more of the methods described herein. In one example, computer system 800 may correspond to a computing device capable of executing text recognition component 110 of FIG. 1A. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored instructions 826 (e.g., corresponding to the methods of FIGS. 7-8, etc.) embodying any one or more of the methodologies or functions described herein. Instructions 826 may also reside, completely or at least partially, within the main memory 804 and/or within the processing device 802 during execution thereof by the computer system 800, the main memory 804 and the processing device 802 also constituting computer-readable media. Instructions 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
receiving an image depicting a line of text;
segmenting the image into one or more fragment images;
for each of the one or more fragment images,
    determining a first hypothesis to segment the fragment image into a first plurality of grapheme images;
    applying a recognition neural network model to the first plurality of grapheme images to identify:
        a plurality of symbols corresponding to the first plurality of grapheme images, and
        a first plurality of classification confidence scores associated with the first plurality of grapheme images;
    determining, using the first plurality of classification confidence scores, a first fragmentation confidence score for the first hypothesis;
    determining a second hypothesis to segment the fragment image into a second plurality of grapheme images;
    determining a second fragmentation confidence score for the second hypothesis; and
    determining that the first fragmentation confidence score is greater than the second fragmentation confidence score; and
assembling the plurality of symbols of each fragment image to derive the line of text.

2. The method of claim 1, wherein segmenting the image into one or more fragment images is performed based on visual features identified in the line of text.

3. The method of claim 1, further comprising:
applying a language detection neural network model to the fragment image to determine a language associated with the fragment image,
wherein the plurality of symbols is selected from a corpus of symbols of the determined language.

4. The method of claim 1, further comprising:
applying a structural classification model to the first plurality of grapheme images to identify a second plurality of classification confidence scores associated with the first plurality of grapheme images, wherein each of the second plurality of classification confidence scores characterizes structural similarity of a respective grapheme image to a reference grapheme image; and
wherein the first fragmentation confidence score is further determined using he second plurality of classification confidence scores.

5. The method of claim 1, further comprising:
determining that the first fragmentation confidence score is greater than a predetermined threshold.

6. The method of claim 1, wherein the recognition neural network model is trained using a loss function, wherein the loss function includes a cross entropy loss function or a center loss function.

7. The method of claim 6, wherein the loss function includes a close-to-center penalty loss function.

8. The method of claim 1, wherein the recognition neural network model includes a first input for a grapheme image and a second input for geometric features of the grapheme image.

9. The method of claim 8, wherein the geometric features of the grapheme image comprise one or more of:
a ratio of pixels of a width of the grapheme image to a height of the grapheme image,
a ratio of a base line of a symbol in the grapheme image to the height of the grapheme image, or
a ratio of a height of the symbol in the grapheme image to the height of the grapheme image.

10. The method of claim 1, further comprising validating the plurality of symbols with a morphological, a dictionary, or a syntactical model.

11. A system, comprising:
a memory;
a processor, coupled to the memory, the processor configured to:
receive an image depicting a line of text;
segment the image into one or more fragment images;
for each of the one or more fragment images,
    determine a first hypothesis to segment the fragment image into a first plurality of grapheme images;
    apply a recognition neural network model to the first plurality of grapheme images to identify:
        a plurality of symbols corresponding to the first plurality of grapheme images, and
        a first plurality of classification confidence scores associated with the first plurality of grapheme images;
    determine, using the first plurality of classification confidence scores, a first fragmentation confidence score for the first hypothesis;
    determine a second hypothesis to segment the fragment image into a second plurality of grapheme images;
    determine a second fragmentation confidence score for the first hypothesis; and
    determine that the first fragmentation confidence score is greater than the second fragmentation confidence score; and
assemble the plurality of symbols of each fragment image to derive the line of text.

12. The system of claim 11, wherein segmenting the image into one or more fragment images is performed based on visual features identified in the line of text.

13. The system of claim 11, wherein the processor is further configured to:
apply a language detection neural network model to the fragment image to determine a language associated with the fragment image,
wherein the plurality of symbols is selected from a corpus of symbols of the determined language.

14. The system of claim 11, wherein the processor is further configured to:
apply a structural classification model to the first plurality of grapheme images to identify a second plurality of classification confidence scores associated with the first plurality of grapheme images, wherein each of the second plurality of classification confidence scores characterizes structural similarity of a respective grapheme image to a reference grapheme image; and wherein the first fragmentation confidence score is further determined using he second plurality of classification confidence scores.

15. A computer-readable non-transitory storage medium comprising executable instructions that, when executed by a computer system, cause the computer system to:
- receive an image depicting a line of text;
- segment the image into one or more fragment images;
- for each of the one or more fragment images,
  - determine a first hypothesis to segment the fragment image into a first plurality of grapheme images;
  - apply a recognition neural network model to the first plurality of grapheme images to identify:
    - a plurality of symbols corresponding to the first plurality of grapheme images, and
    - a first plurality of classification confidence scores associated with the first plurality of grapheme images;
  - determine, using the first plurality of classification confidence scores, a first fragmentation confidence score for the first hypothesis;
  - determine a second hypothesis to segment the fragment image into a second plurality of grapheme images;
  - determine a second fragmentation confidence score for the first hypothesis; and
  - determine that the first fragmentation confidence score is greater than the second fragmentation confidence score; and
- assemble the plurality of symbols of each fragment image to derive the line of text.

16. The computer-readable non-transitory storage medium of claim 15, wherein segmenting the image into one or more fragment images is performed based on visual features identified in the line of text.

17. The computer-readable non-transitory storage medium of claim 15, further comprising executable instructions that, when executed by a computer system, cause the computer system to:
- apply a language detection neural network model to the fragment image to determine a language associated with the fragment image,
wherein plurality of symbols is selected from a corpus of symbols of the determined language.

18. The computer-readable non-transitory storage medium of claim 17, wherein the instructions are further to cause the computer system to:
- apply a structural classification model to the first plurality of grapheme images to identify a second plurality of classification confidence scores associated with the first plurality of grapheme images, wherein each of the second plurality of classification confidence scores characterizes structural similarity of a respective grapheme image to a reference grapheme image; and
- wherein the first fragmentation confidence score is further determined using the second plurality of classification confidence scores.

* * * * *